United States Patent [19]

Gerace et al.

[11] Patent Number: 5,278,258

[45] Date of Patent: Jan. 11, 1994

[54] CROSS-LINKED SILICONE POLYMERS, FAST CURING SILICONE PRECURSOR COMPOSITIONS, AND INJECTABLE INTRAOCULAR LENSES

[75] Inventors: John D. Gerace, Laguna Niguel; F. Richard Christ, Laguna Beach, both of Calif.

[73] Assignee: Allergan, Inc., Irvine, Calif.

[21] Appl. No.: 885,136

[22] Filed: May 18, 1992

[51] Int. Cl.$^5$ .................. C08G 77/20; C08F 283/12
[52] U.S. Cl. .................................... 525/478; 528/15; 528/31; 528/32
[58] Field of Search .................. 525/478; 528/15, 31, 528/32

[56] References Cited

U.S. PATENT DOCUMENTS

| | | | |
|---|---|---|---|
| 3,284,406 | 11/1966 | Nelson | 260/46.5 |
| 3,341,490 | 9/1967 | Burdick | 260/37 |
| 3,457,214 | 7/1969 | Modic | 260/37 |
| 3,992,355 | 11/1976 | Itoh et al. | 260/46.5 UA |
| 3,996,187 | 12/1976 | Travnicek | 260/37 SB |
| 3,996,189 | 12/1976 | Travnicek | 260/37 SB |
| 4,122,246 | 10/1978 | Sierawski | 528/15 |
| 4,380,643 | 4/1983 | Yoshida et al. | 548/260 |
| 4,418,165 | 11/1983 | Polmanteer et al. | 523/210 |
| 4,535,141 | 8/1985 | Kroupa | 528/15 |
| 4,542,542 | 9/1985 | Wright | 623/6 |
| 4,573,998 | 3/1986 | Mazzocco | 623/6 |
| 4,608,050 | 8/1986 | Wright et al. | 623/6 |
| 4,615,702 | 10/1986 | Koziol et al. | 623/6 |
| 4,647,282 | 3/1987 | Fedorov et al. | 623/4 |
| 4,737,558 | 4/1988 | Falcetta et al. | 526/279 |
| 4,785,047 | 11/1988 | Jensen | 524/714 |
| 4,801,642 | 1/1989 | Janik et al. | 524/714 |
| 4,868,151 | 9/1989 | Reich et al. | 525/479 |
| 4,882,398 | 11/1989 | Mbah | 525/478 |
| 4,973,642 | 11/1990 | Donatelli et al. | 528/15 |
| 4,990,560 | 2/1991 | Ikeno et al. | 524/731 |

FOREIGN PATENT DOCUMENTS 1273144  8/1990  Canada.
0110537  6/1984  European Pat. Off..

OTHER PUBLICATIONS

Nishi, Okihiro, "Refilling the lens of the rabbit eye after intercapsular cataract surgery using an endocapsular balloon and an anterior capsule suturing technique", J. Cataract Refract Surgery–vol. 15, Jul. 1989.

Nishi, et al., "Further development of experimental techniques for refilling the lens of animal eyes with a balloon", J. Cataract Refract Surg–vol. 15, Sep. 1989.

Parel et al., "Phaco-Ersatz:cataract surgery designed to preserve accommodation", Graefe's Arch Clin Exp Ophthalmol (1986) 224:165–173.

Haefliger, et al., "Accommodation of an Endocapsular Silicone Lens (Phaco-Ersatz) in the Nonhuman Primate", Ophthalmology, May 1987, vol. 94, No. 5.

Saam, Formation of Linear Siloxane Polymers, 1990 American Chemical Society, pp. 71–89.

(List continued on next page.)

*Primary Examiner*—John C. Bleutge
*Assistant Examiner*—Margaret W. Glass
*Attorney, Agent, or Firm*—Gordon L. Peterson

[57] ABSTRACT

Polymeric materials which are optically clear and resistant to discoloration are disclosed. In one embodiment, such compositions comprise optically clear, cross-linked polymers derived from a mixture comprising (A) a vinyl-containing polyorganosiloxane component, and (B) an organosilicon component including silicon-bonded hydride groups which react with vinyl groups included in (A) during the polymerization and (C) an effective platinum group metal-containing catalyst component, provided that the mole ratio of vinyl groups to silicon-bonded hydride groups in the mixture is greater than 1.2, preferably greater than about 4 or about 5, and is such that the polymer has a reduced discoloration susceptibility relative to a substantially identical polymer having a mole ratio of vinyl groups to silicon-bonded hydride groups in the precursor mixture equal to 1.2.

12 Claims, No Drawings

OTHER PUBLICATIONS

Fish et al., Ring Opening Polymerization of Cyclotetrasiloxanes with Large Substituents, pp. 36–37, Polymer Reprints, 31(1), Apr. 1990.

Boutevin et al., Synthesis of Fluorinated Polysiloxanes. 8. Properties at Low and High Temperatures of Polysiloxanes with Fluronated Graft Macromolecules, vol. 24, (3), pp. 629–632 (Feb. 4, 1991).

Rasoul et al., Thermal and Rheological Properties of Alkyl-Substitute Polysiloxanes, 1990 American Chemical Society, pp. 91–96.

Zapf et al., Synthesis and Properties of New UV-Curable Silicones with High Refractive Index, Polymeric Prints 30(2), pp. 107 (1989).

Grigoras et al., Conformational Analysis of Substituted Polysiloxane Polymers, 1990 American Chemical Society, pp. 125–144.

CROSS-LINKED SILICONE POLYMERS, FAST CURING SILICONE PRECURSOR COMPOSITIONS, AND INJECTABLE INTRAOCULAR LENSES

BACKGROUND OF THE INVENTION

The present invention relates to optically clear, cross-linked silicone polymers, to fast curing precursor compositions useful for producing such polymers, to intraocular lenses (IOLs), for example, injectable IOLs, and to methods of forming such IOLs. More particularly, the invention relates to such silicone polymers, fast curing precursor compositions, injectable IOLs and methods which provide substantial benefits, for example, silicone polymers and injectable IOLs which have reduced discoloration susceptibility.

Silicone polymers are known materials and many are known to be produced using platinum group metal-containing catalysts, which catalysts become an integral part of the final product. For example, certain silicone polymers are known to be useful in the production of IOLs. Also, certain curable liquid compositions comprising monomers which can be cured in the presence of platinum group metal-containing catalysts to form silicone polymers have been suggested for use in forming a solid, transparent synthetic lens upon being injected into the lens capsule of an eye from which the natural lens has been removed. Such solid, transparent synthetic lenses formed in the eye may be considered or termed "injectable IOLs". See, for example, Wright et al U.S. Pat. No. 4,608,050, which is incorporated in its entirety herein by reference.

Injectable IOLs which comprise cross-linked silicone polymers are cured or cross-linked in the eye, at physiological temperature, for example, about 35°-37° C. In order to obtain a desirably fast cure rate, relatively high levels of catalyst, in particular platinum group metal-containing catalyst, are used.

One problem that presents itself in the use of such fast curing liquid precursor compositions is that over time the resulting polymer tends to discolor. Such discoloration, which is believed to be associated with the relatively high platinum group metal-containing catalyst levels in the precursor compositions, is disadvantageous. Therefore, it would be advantageous to provide fast curing precursor compositions which yield polymers having a reduced susceptibility to discoloration.

Sierawski U.S. Pat. No. 4,122,246 discloses a silicone gel which discolors less on aging than other platinum catalyzed silicone gels. The disclosed silicone gel is prepared by mixing vinyl-containing polyorganosiloxane, a silicon-bonded hydrogen containing organosiloxane compound, a platinum catalyst, a polysiloxane having at least two vinyl radicals and at least one silicon-bonded hydroxyl radical, and an epoxy-containing alkoxy silane. The mol ratio of silicon-bonded vinyl groups to silicon-bonded hydrogen atoms in the vinyl-containing polyorganosiloxane plus silicon-bonded hydrogen containing organosiloxane compound is greater than 1, preferably greater than 1.1, while the mol ratio of silicon-bonded vinyl radicals to silicon-bonded hydrogen atoms in the entire mixture is preferably from 1.2 to 3.3. The presence of epoxy silanes in the polymerization mixture can result in quality control problems. For example, the epoxy silanes can provide large numbers of crosslinks which can result in products not having the desired characteristics. Also, injecting a mixture containing such epoxy silanes into the eye may have detrimental effects on the eye. Therefore, it would be advantageous to provide fast curing precursor compositions, e.g., useful for injection into the eye, yielding silicone polymers which have reduced susceptibility to discoloration without the need to include epoxy silanes.

SUMMARY OF THE INVENTION

New cross-linked silicone polymers, fast curing precursor compositions useful for providing cross-linked silicone polymers, IOLs, preferably injectable IOLs, and methods of forming such IOLs have been discovered. The present precursors have compositions which reduce the discoloration susceptibility of the resulting cured polymer even if the polymerization is catalyzed with a relatively high concentration of platinum group metal component, and which preferably do not include epoxy silanes, in particular epoxy-containing alkoxy silanes. Moreover, such cured polymers are optically clear. The present curable compositions are very effective when injected into the lens capsule of an eye and caused to form an injectable IOL, or when used to produce IOL optics. The present polymers and compositions can be produced using materials which are commercially available and processing techniques which are well known in the art.

In one broad aspect, the present invention is directed to compositions which comprise an optically clear, cross-linked polymer derived from the polymerization, e.g., cross-linking, of a mixture of (A) a vinyl-containing polyorganosiloxane component, and (B) an organosilicon component including silicon-bonded hydride groups which react with vinyl groups included in (A) during the polymerization, and (C) an effective amount of a platinum group metal-containing catalyst component. It is important that the mol ratio of vinyl groups to silicon-bonded hydride groups in the mixture is greater than 1.2, preferably greater than about 4 and more preferably greater than about 5. In one embodiment, the present precursor mixtures are substantially free of epoxy silanes. Particularly useful precursor mixtures consist essentially of (A), (B) and (C). It has been found that cross-linked polymers produced from such precursor mixtures or compositions, for example, fast curing precursor mixtures containing at least about 10 ppm by weight of platinum group metal catalyst component (calculated as elemental platinum group metal), have a reduced discoloration susceptibility relative to a substantially identical polymer derived from a precursor mixture having a mol ratio of vinyl groups to silicon-bonded hydride groups equal to 1.2.

Both the cross-linked or cured polymers and the precursor compositions, as described herein, are included within the scope of the present invention.

In a further aspect of the present invention, methods of forming an IOL, for example, an injectable IOL, are provided. Such methods comprise forming a mixture of (A) a vinyl-containing polyorganosiloxane component, (B) an organosilicon component including silicon-bonded hydride groups which react with vinyl groups included in (A) when (A) and (B) are polymerized and (C) a platinum group metal-containing catalyst component in an amount effective to promote the polymerization of (A) and (B). The mol ratio of vinyl groups to silicon-bonded hydride groups in the mixture is greater than about 1.2, preferably greater than about 4 and more preferably greater than about 5, and is such that the cross-linked polymer formed from the polymerization of (A) and (B) has a reduced discoloration susceptibility relative to a substantially identical polymer having a mol ratio of vinyl groups to silicon-bonded hydride groups in the precursor mixture equal to 1.2. This mixture is subjected to conditions effective to form the polymer. In a particularly useful embodiment, a fast curing precursor mixture, as described herein, is injected into the eye, e.g., into the lens capsule of the eye, and forms the cured polymer, in an injectable IOL, at the conditions present in the eye. Precursor mixtures which are substantially free of epoxy silanes, as described herein, may be employed. Mixtures which consist essentially of (A), (B) and (C) are useful.

DETAILED DESCRIPTION OF THE INVENTION

This invention relates to cross-linked polymers, curable compositions, preferably fast curing compositions, to provide such cross-linked polymers, IOLs, preferably injectable IOLs, and methods of forming such IOLs. The present cross-linked polymers advantageously have reduced susceptibility to discoloration. These polymers are derived from component (A), one or more vinyl-containing polyorganosiloxanes; component (B), one or more organosilicon compounds including silicon-bonded hydride groups which react with vinyl groups included in (A); and component (C), a platinum group metal-containing catalyst component in an amount effective to promote the polymerization, e.g., cross-linking, of (A) and (B).

Component (A) preferably has an average of at least two silicon-bonded vinyl radicals per molecule. The number of vinyl radicals can vary from two per molecule. For example, component (A) can be a blend of two or more polyorganosiloxanes in which some molecules may have more vinyl radicals than two per molecule and some may have less than two vinyl radicals per molecule. Although it is not required that the silicon-bonded vinyl radicals be located in the alpha, omega (or terminal) positions of the polyorganosiloxanes, it is preferred that at least some of the vinyl radicals be located in these positions. The vinyl radicals are preferably located at the polymer ends because such polyorganosiloxanes are economical to prepare and provide satisfactory products. However, because of the polymeric nature of component (A), its preparation may result in products which have some variations in structure, and some vinyls may not be in the terminal positions even if the intent is to have them in these positions. Thus, the resulting polyorganosiloxanes may have a portion of the vinyl radicals located at branch sites.

The polyorganosiloxanes of component (A) are preferably essentially linear polymers which can have some branching. The polyorganosiloxanes may have silicon-oxygen-silicon backbones with an average of greater than two organo groups per silicon atom. Preferably, component (A) is made up of diorganosiloxane units with triorganosiloxane units for end groups, but small amounts of monoorganosiloxane units and SiO$_2$ units may also be present. The organo radicals preferably have less than about 10 carbon atoms per radical and are each independently selected from monovalent hydrocarbon radicals such as methyl, ethyl, vinyl, propyl, hexyl and phenyl and monovalent substituted hydrocarbon radicals, such as the perfluoroalkylethyl radicals. Examples of component (A) include dimethylvinylsiloxy endblocked polydimethylsiloxane, methylphenylvinylsiloxy endblocked polydimethylsiloxane, dimethylvinylsiloxy endblocked polymethyl-(3,3,3-trifluoropropyl)siloxane, dimethylvinylsiloxy endblocked polydiorganosiloxane copolymers of dimethylsiloxane units and methylphenylsiloxane units, and methylphenylvinylsiloxy endblocked polydiorganosiloxane copolymers of dimethylsiloxane units and diphenylsiloxane units, and the like. The polyorganosiloxanes can have siloxane units such as dimethylsiloxane units, methylphenylsiloxane units, diphenylsiloxane units, methyl-(3,3,3-trifluoropropyl)siloxane units, monomethylsiloxane units, monophenylsiloxane units, dimethylvinylsiloxane units, trimethylsiloxane units, methylphenylvinylsiloxane units, and SiO$_2$ units. Polyorganosiloxanes of component (A) can be single polymers or mixtures of polymers. These polymers preferably have at least about 50 percent of the organic radicals as methyl radicals. Many polyorganosiloxanes useful as component (A) are well known in the art. A preferred component (A) is a polydimethylsiloxane endblocked with dimethylvinylsiloxy units or methylphenylvinylsiloxy units having a viscosity of about 500 to about 100,000 centipoise at 25° C.

Component (B) includes organosilicon compounds containing at least 2, and preferably at least 3, silicon-bonded hydride groups, i.e., hydrogen atoms, per molecule. Each of the silicon-bonded hydride groups is preferably bonded to a different silicon atom. The remaining valences of the silicon atoms are satisfied by divalent oxygen atoms or by monovalent radicals, such as alkyl having 1 to about 6 carbon atoms per radical, for example, methyl, ethyl, propyl, isopropyl, butyl, tertiary butyl, pentyl, hexyl, cyclohexyl, substituted alkyl radicals, aryl radicals, substituted aryl radicals and the like. The silicon-bonded hydride group containing organosilicon compounds can be homopolymers, copolymers and mixtures thereof which contain siloxane units of the following types:

RSiO$_{1.5}$, R$_2$SiO, R$_3$SiO$_{0.5}$, RHSiO, HSiO$_{1.5}$, R$_2$HSiO$_{0.5}$, H$_2$SiO, RH$_2$SiO$_{0.5}$ and SiO where R is the monovalent radical, for example, as defined above. Examples include polymethylhydrogensiloxane cyclics, copolymers of trimethylsiloxy and methylhydrogensiloxane, copolymers of dimethylhydrogensiloxy and methylhydrogensiloxane, copolymers of trimethylsiloxy, dimethylsiloxane and methylhydrogensiloxane, copolymers of dimethylhydrogensiloxane, dimethylsiloxane and methylhydrogensiloxane and the like.

The platinum group metal catalyst component, component (C), can be any of the compatible platinum group metal-containing catalysts known to catalyze the addition of silicon-bonded hydrogen atoms (hydride groups) to silicon-bonded vinyl radicals. Platinum group metal-containing catalysts can be any of the known forms which are compatible such as, platinic chloride, salts of platinum, chloroplatinic acid and various complexes. The platinum group metal-containing catalyst component, can be used in any catalytic quantity, such as in an amount sufficient to provide at least about 0.1 ppm weight of platinum group metal (calculated as elemental metal) based on the combined weight of component (A) and component (B). Preferably at least about 10 ppm, for example, at least about 20 ppm or at least 30 ppm or at least about 40 ppm, by weight of platinum group metal, based on the combined weight of component (A) and component (B), is used. In one useful embodiment, the platinum group metal-containing component is chloroplatinic acid, preferably complexed with a siloxane such as tetramethylvinylcyclosiloxane (i.e. 1,3,5,7-tetramethyl-1,3,5,7-tetravinylcyclosiloxane).

A reinforcer component may be dispersed in the final cross-linked polymer. When an injectable IOL is to be provided, it is preferred that no such reinforcer component be included. In accordance with one embodiment of the invention, the reinforcer component may be used in a ratio of about 15 to about 45 parts by weight of the reinforcer component to 100 parts of the total elastomeric composition containing the final cross-linked polymer.

Silica, for example, fume silica, and organic resins are very useful as the reinforcer component. Fume silica itself is commercially available. Processes for trimethylsilylating the surface of fume silica for the purpose of rendering the silica surface hydrophobic and more compatible with component (A) are also known and within the skill of the art. A number of organic resins are known to be useful for reinforcing articles which include cross-linked silicone polymers or silicone elastomers. Of course, the reinforcer component used in the present elastomeric compositions employed in optical applications should be optically clear or at least have no significant detrimental effect on the optical clarity of the final product, e.g., the elastomeric composition. The refractive index of the reinforcer component is preferably at least about equal to or greater than the refractive index of the cross-linked polymer.

The fume silica reinforcer useful in the present compositions may have a surface area of about 100 to about 450 meters$^2$/gram.

In the preparation of elastomeric compositions including the present cross-linked polymers, component (A) may be intimately mixed with a reinforcer component. The intimate mixing is preferably aided by treating the mixture on a roll mill or like device.

Component (A), with or without an reinforcer component, is hereinafter referred to as the "base".

The base preferably has a suitable optical refractive index and a viscosity in such a range which permits intimate mixing of the base with components (B) and (C), and subsequent processing for forming IOLs, for example, injectable IOLs. An acceptable viscosity range for this purpose is about 1,000 to about 80,000 centipoise at 25° C.

The base may have the inherent characteristic of providing, after suitable cross-linking, an elastomeric composition having physical properties which are highly advantageous for inclusion in a foldable IOL.

Preparation of the uncured base for cross-linking may be accomplished as follows. The base is divided into two aliquots which preferably are of equal weight. The aliquots are termed "Part A" and "Part B" or first and second aliquot parts. The silicon-bonded vinyl groups of component A are present in both the first and second aliquots of the base.

Component (B) is added to the second aliquot (Part B).

The platinum group metal-, preferably platinum-, containing catalyst, component (C), may be added to the first aliquot (Part A).

After mixing of the aliquots (Part A and Part B), the cross-linking preferably should not proceed too rapidly at room temperature. For example, if an injectable IOL is to be produced, the mixture should be such that work times at room temperature of at least about 1 minute, preferably about 2 minutes to about 10 or about 20 minutes, are provided. If the cross-linked polymer is to be formed outside the constraints of the eye, the mixture should be such that work times at room temperature of at least about 2, preferably at least about 4 or about 6, hours are provided. A suitable cross-linking inhibitor, such as 1, 2, 3, 4 tetramethyl- 1,2,3,4-tetravinyl cyclotetrasiloxane, may be added to the second aliquot (Part B). The cross-linking inhibitor may be added to the second aliquot in an amount in the range of about 0.01 to about 0.2 parts per hundred by weight.

An ultraviolet light absorbing material, preferably a polymerizable ultraviolet light absorbing material, may be mixed into the second aliquot.

The ultraviolet light absorbing material, for example, selected from vinyl functional 2-hydroxybenzophenones and vinyl functional benzotrizoles, is preferably covalently linked to the silicone elastomer of the elastomeric composition during the cross linking step. More preferably, the ultraviolet absorbing material is 2(2'-hydroxy-3'-t-butyl-5'vinyl-phenyl)-5-chloro-2H-benzotriazole. The ultraviolet light absorbing material is preferably added to the second aliquot in an amount in the range of about 0.1% to about 1% or about 5% by weight. The curing or cross-linking occurs at conditions effective to provide the desired elastomeric composition. Curing temperatures may vary, for example, from about 20° C. to about 200° C., and curing times may range, for example, from about 1 minute to about 5 hours or about 10 hours or more.

When the precursor composition is to be introduced or injected into the eye, the curing temperature is the physiological temperature in the eye, for example, for humans in the range of about 35° C. to about 37° C. Lack of mobility of the injected composition preferably occurs within about 20 minutes, more preferably within about 10 minutes, of injection. Final cure preferably occurs within about 6 hours, more preferably within about 2 hours, of injection.

Formation of IOL bodies or optics from the elastomeric compositions of the present invention may be accomplished by liquid injection molding or by cast or compression molding or other types of molding of the intimately mixed first and second aliquots. Although these processes are well known in the art they are briefly summarized as follows.

In the liquid injection molding process the mixed aliquots are injected into a hot mold kept at about 120° C. to about 150° C. The cross-linking or curing process may then be completed in about five minutes.

In the cast or compression molding process, the mixed aliquots are placed into appropriate molds, and the molds are thereafter positioned in an oven heated to about 120° C. to about 180° C. Under these conditions the cure is completed in about 1 to about 30 minutes. The cast molding process can also be completed at room temperature in significantly longer time periods.

The IOLs made in accordance with the present invention have the above-described advantageous optical and mechanical properties.

Because of the reduced susceptibility to discoloration, relatively high concentrations of platinum group metal-containing component are advantageously used without resulting in substantial discoloration of the final polymeric composition. The high concentration of platinum group metal-containing component are very advantageously used when the mole ratio of vinyl groups to silicon-bonded hydride groups in the precursor mixture is at least about 5.

The following non-limiting examples illustrate certain aspects of the present invention.

EXAMPLES 1 TO 4

A series of addition-cure cross-linked polysiloxane polymer compositions were prepared and tested as follows.

Two commercially available, base polymers were used. Base polymer I had approximately the following formula

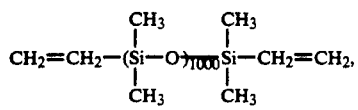

and base polymer II had approximately the following formula

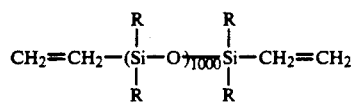

wherein each R is either vinyl or methyl. In base polymer I, the number of vinyl groups equals to about 0.2% of the total of vinyl groups plus methyl groups. In base polymer II, the number of vinyl groups is equal to about 1.2% of the total of vinyl groups plus methyl groups.

Two commercially available cross-linker components were used. Cross-linker component III had approximately the following formula

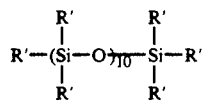

wherein each R' is either methyl or H, provided that the total number of Hs in cross-linker component III is equal to about 50% of the total number of methyl groups plus Hs. Cross-linker component IV has a formula similar to that of cross-linker component III except that the total number of Hs in cross-linker component IV is equal to about 20% of the total number of methyl groups plus Hs.

Each polymer composition was prepared as follows. Equal weights of a base polymer and a cross-linker component were mixed together with a commercially available platinum-containing catalyst. The mixture was allowed to cure at room temperature. After curing, the cured material was subjected to a dry atmosphere at 100° C. for about 1 hour. After this exposure, the color of the cured material was noted.

| Results of these tests are as follows | | | | |
|---|---|---|---|---|
| Composition | 1 | 2 | 3 | 4 |
| Base Polymer | I | I | II | II |
| Cross-linker Component | III | III | III | IV |
| Vinyl to Hydride Ratio in Mixture, molar | 0.38 | 1.12 | 8.73 | 6.46 |
| Platinum Concentration, ppm | 12 | 28 | 47 | 48 |
| Color of Cured Material After Exposure | Yellow/Brown | Brown | Clear | Clear |

These results demonstrate that cured or cross-linked polysiloxane polymers derived from precursor components in which the vinyl to hydride mole ratio is greater than 1 have reduced susceptibility to discoloration relative to similar polymers derived from precursor components having a vinyl to hydride mole ratio of 1 or less. It is particularly interesting to note that when the precursor vinyl to hydride mole ratio is greater than about 1, preferably greater than about 5, increased concentrations of platinum catalyst may be employed without detrimentally affecting the discoloration susceptibility of the final polymer. This is advantageous since increased catalyst concentrations provide for polymer curing at reduced temperatures and/or in reduced times. In many prior art formulations, the amount of platinum-containing catalyst was minimized in an attempt to avoid discoloration. However, in accordance with the present invention, advantageously large amounts of platinum-containing catalyst can be employed with reduced susceptibility to discoloration in the final polymer composition.

EXAMPLES 5 AND 6

The precursor mixtures used to produce Compositions 3 and 4 are each injected into an evacuated lens capsule of a human eye. Over a period of time, the mixtures each cure into an optically clear polymeric composition. Satisfactory results are obtained in terms of continued optical clarity of the cured material over a prolonged period of time, for example, in the range of about one month to about 6 months or a year after injection.

While this invention has been described with respect to various specific examples and embodiments, it is to be understood that the invention is not limited thereto and that it can be variously practiced within the scope of the following claims.

What is claimed is:

1. A composition comprising an optically clear, cross-linked polymer having a chemical make-up so as to be useful in the optic of an intraocular lens, said polymer being derived from the polymerization of a mixture comprising
   (A) a vinyl-containing polyorganosiloxane component, (B) an organosilicon component including silicon-bonded hydride groups which react with vinyl groups included in (A) during said polymerization and (C) an effective amount of a platinum group metal-containing catalyst component, provided that the mole ratio of vinyl groups to silicon-bonded hydride groups in the mixture is at least about 6.46 and is such that said polymer has a reduced discoloration susceptibility relative to a substantially identical polymer having a mole ratio of vinyl groups to silicon-bonded hydride groups in the precursor mixture equal to 1.2.

2. The composition of claim 1 wherein said platinum group metal-containing catalyst component is present in an amount of at least about 10 ppm by weight, based on the total weight of (A) plus (B), calculated as elemental platinum group metal.

3. A composition useful for forming a polymer comprising a mixture of (A) a vinyl-containing polyorganosiloxane component, (B) an organosilicon component including silicon-bonded hydride groups which react with vinyl groups included in (A) at polymerization conditions, and (C) a platinum group metal-containing catalyst component in an amount effective to promote the polymerization of (A) and (B), provided that the polymer formed from the polymerization of the mixture is optically clear, cross-linked and has a chemical make-up so as to be useful in the optic of an injectable intraocular lens and the mole ratio of vinyl groups to silicon-bonded hydride groups in the mixture as at least about 6.46 and is such that the polymer formed from the polymerization of the mixture has a reduced discoloration susceptibility relative to a substantially identical polymer having a mole ratio of vinyl groups to silicon-bonded hydride groups in the precursor equal to 1.2.

4. The composition of claim 3 wherein said platinum group metal-containing catalyst component is present in an amount of at least about 10 ppm by weight, based on the total weight of (A) plus (B), calculated as elemental platinum group metal.

5. A composition comprising an optically clear, cross-linked polymer having a chemical make-up so as to be useful in the optical of an intraocular lens, said polymer being derived from the polymerization of a mixture comprising
(A) a vinyl-containing polyorganosiloxane component, (B) an organosilicon component including silicon-bonded hydride groups which react with vinyl groups included in (A) during said polymerization and (C) an effective amount of a platinum group metal-containing catalyst component, provided that the mixture is free of epoxy-containing alkoxy silanes and the mole ratio of vinyl groups to silicon-bonded hydride groups in the mixture is at least about 6.46 and is such that said polymer has a reduced discoloration susceptibility relative to a substantially identical polymer having a mole ratio of vinyl groups to silicon-bonded hydride groups in the precursor mixture equal to 1.2.

6. The composition of claim 5 wherein said platinum group metal-containing catalyst component is present in an amount of at least about 10 ppm by weight, based on the total weight of (A) plus (B), calculated as elemental platinum group metal.

7. A composition useful for forming a polymer consisting essentially of a mixture of (A) a vinyl-containing polyorganosiloxane component, (B) an organosilicon component including silicon-bonded hydride groups which react with vinyl groups included in (A) at polymerization conditions, and (C) a platinum group metal-containing catalyst component in an amount effective to promote the polymerization of (A) and (B), provided that the polymer derived from the polymerization of the mixture is optically clear, cross-linked and has a chemical make-up so as to be useful in the optic of an injectable intraocular lens and the mixture is free of epoxy-containing alkoxy silanes and the mole ratio of vinyl groups to silicon-bonded hydride groups in (A) plus (B) is at least about 6.46 and is such that the polymer formed from the polymerization of the mixture has a reduced discoloration susceptibility relative to a substantially identical polymer having a mole ratio of vinyl groups to silicon-bonded hydride groups in the precursor mixture equal to 1.2.

8. The composition of claim 7 wherein said platinum group metal-containing catalyst component is present in an amount of at least about 10 ppm by weight, based on the total weight of (A) plus (B), calculated as elemental platinum group metal.

9. A composition comprising an optically clear, cross-linked polymer derived from the polymerization of a mixture comprising
(A) a vinyl-containing polyorganosiloxane component, (B) an organosilicon component including silicon-bonded hydride groups which react with vinyl groups included in (A) during said polymerization and (C) an effective amount of a platinum group metal-containing catalyst component in the range of about 10 ppm by weight to about 50 ppm by weight, based on the total weight of (A) plus (B), calculated as elemental platinum group metal, provided that the mole ratio of vinyl groups to silicon-bonded hydride groups in the mixture is at least about 6.46 and is such that said polymer has a reduced discoloration susceptibility relative to a substantially identical polymer having a mole ratio of vinyl groups to silicon-bonded hydride groups in the precursor mixture equal to 1.2.

10. A composition useful for forming a polymer comprising a mixture of (A) a vinyl-containing polyorganosiloxane component, (B) an organosilicon component including silicon-bonded hydride groups which react with vinyl groups included in (A) at polymerization conditions, and (C) a platinum group metal-containing catalyst component in an amount effective to promote the polymerization of (A) and (B) in the range of about 10 ppm by weight to about 50 ppm by weight, based on the total weight of (A) plus (B), calculated as elemental platinum group metal, provided that the mole ratio of vinyl groups to silicon-bonded hydride groups in the mixture is at least about 6.46 and is such that the polymer formed from the polymerization of (A) and (B) has a reduced discoloration susceptibility relative to a substantially identical polymer having a mole ratio of vinyl groups to silicon-bonded hydride groups in the precursor mixture equal to 1.2.

11. The composition of claim 5 wherein said platinum group metal-containing catalyst component is present in an amount in the range of about 10 ppm by weight to about 50 ppm by weight, based on the total weight of (A) plus (B), calculated as elemental platinum group metal.

12. The composition of claim 7 wherein said platinum group metal-containing catalyst component is present in an amount in the range of about 10 ppm by weight to about 50 ppm by weight, based on the total weight of (A) plus (B), calculated as elemental platinum group metal.

* * * * *

UNITED STATES PATENT AND TRADEMARK OFFICE
CERTIFICATE OF CORRECTION

PATENT NO. : 5,278,258
DATED : January 11, 1994
INVENTOR(S) : Gerace et al

It is certified that error appears in the above-indentified patent and that said Letters Patent is hereby corrected as shown below:

Column 9, line 13, claim 3; delete "as" and insert in place thereof --is--.

Column 9, line 26, claim 5; delete "optical" and insert in place thereof --optic--.

Signed and Sealed this

Twenty-fifth Day of April, 1995

Attest:

BRUCE LEHMAN

Attesting Officer

*Commissioner of Patents and Trademarks*